United States Patent
Musuraca

(10) Patent No.: US 7,401,415 B2
(45) Date of Patent: Jul. 22, 2008

(54) PINION GEAR DEPTH MEASUREMENT TOOL

(75) Inventor: John V. Musuraca, Mason, OH (US)

(73) Assignee: RATECH, Cincinnati, OH (US)

( * ) Notice: Subject to any disclaimer, the term of this patent is extended or adjusted under 35 U.S.C. 154(b) by 437 days.

(21) Appl. No.: 11/158,822

(22) Filed: Jun. 22, 2005

(65) Prior Publication Data

US 2006/0027011 A1  Feb. 9, 2006

Related U.S. Application Data

(60) Provisional application No. 60/599,442, filed on Aug. 6, 2004.

(51) Int. Cl.
*G01D 21/00* (2006.01)
*B25F 1/00* (2006.01)

(52) U.S. Cl. .............................. 33/606; 33/501.7; 7/100

(58) Field of Classification Search .................. 33/606, 33/501.11–501.19, 501.7, DIG. 14, 600, 33/501.05, 501.06, 501.45, 832, 833; 7/100; 254/25, 21; 81/3.55, 3.27, 57.45; 73/1.81
See application file for complete search history.

(56) References Cited

U.S. PATENT DOCUMENTS

| | | | | | |
|---|---|---|---|---|---|
| 2,117,854 | A | * | 5/1938 | Price | 33/833 |
| 2,145,841 | A | | 1/1939 | Walters | 33/181 |
| 2,155,562 | A | | 4/1939 | Price | 33/181 |
| 2,184,340 | A | * | 12/1939 | Ferlin | 7/100 |
| 2,255,996 | A | | 9/1941 | Dodge et al. | 33/181 |
| 2,616,184 | A | * | 11/1952 | Mendro et al. | 33/606 |
| 2,688,193 | A | | 9/1954 | Holton | 33/181 |
| 2,930,136 | A | * | 3/1960 | Knudsen et al. | 33/606 |
| 3,875,646 | A | | 4/1975 | Pfeiffer | 29/407 |
| 4,112,581 | A | * | 9/1978 | Hornsby | 33/534 |
| 4,744,153 | A | * | 5/1988 | Sadigh-Behzadi | 33/517 |
| 5,322,264 | A | * | 6/1994 | Giambro | 254/25 |
| 5,351,413 | A | * | 10/1994 | Bruner et al. | 33/611 |
| 5,459,940 | A | * | 10/1995 | McKenzie | 33/601 |
| 5,655,310 | A | * | 8/1997 | Lawshea, Jr. et al. | 33/600 |
| 6,354,978 | B1 | * | 3/2002 | Brackin et al. | 475/234 |
| 6,460,268 | B1 | * | 10/2002 | Hoefer | 33/645 |

(Continued)

OTHER PUBLICATIONS

Mark Williams Enterprises, Inc., *Deluxe Pinion Depth Checker*, Product Information [on line], [Retrieved Mar. 4, 2004]. Retrieved from the Internet: http://emporium.markwilliams.com/prodinfo.asp-?prodid=1669 (p. 1 of 1).

*Primary Examiner*—G. Bradley Bennett
*Assistant Examiner*—Amy Cohen Johnson
(74) *Attorney, Agent, or Firm*—Wood, Herron & Evans, L.L.P.

(57) ABSTRACT

A measurement tool for determining a position of a pinion gear in a differential assembly includes a mounting member configured to contact an end face of the pinion gear and an elongated arm member extending outwardly from the mounting member. The arm member has an arm portion configured to overlie one of the bearing seats of the differential assembly and an aperture formed in the arm member configured to receive a measurement gage therethrough. The measurement gage is used to measure a distance between a surface of the bearing seat and a reference surface of the arm member from which the position or "pinion depth" of pinion gear can be determined.

27 Claims, 3 Drawing Sheets

U.S. PATENT DOCUMENTS

| | | | |
|---|---|---|---|
| 6,519,865 B1 * | 2/2003 | Yelverton | 33/645 |
| 6,598,305 B1 * | 7/2003 | McKinney et al. | 33/501.7 |
| 6,612,042 B1 * | 9/2003 | McKinney et al. | 33/501.7 |
| 6,705,022 B2 * | 3/2004 | Stopper | 33/702 |
| 7,237,344 B2 * | 7/2007 | Shishikura | 33/645 |
| 2002/0059736 A1 * | 5/2002 | Vencill | 33/832 |
| 2002/0062526 A1 * | 5/2002 | Keldsen | 7/100 |
| 2005/0217031 A1 * | 10/2005 | Carlson | 7/100 |
| 2006/0027011 A1 * | 2/2006 | Musuraca | 73/1.81 |

* cited by examiner

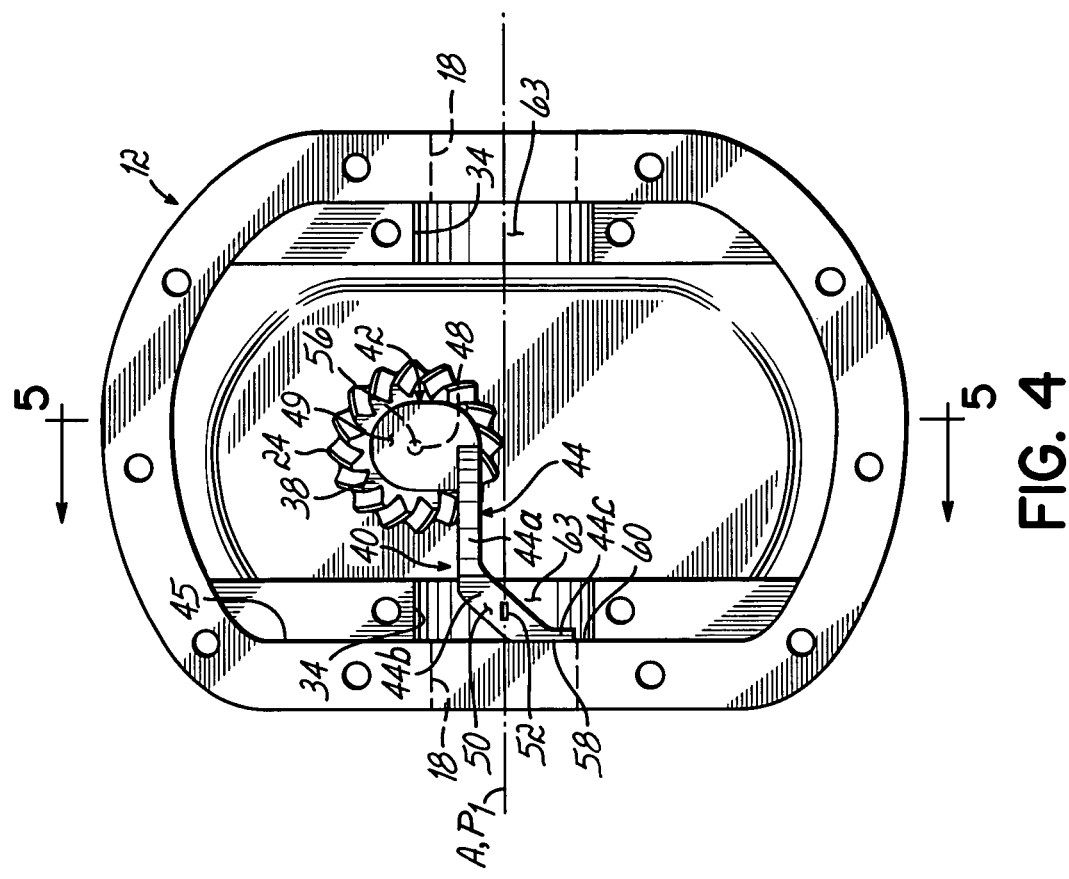
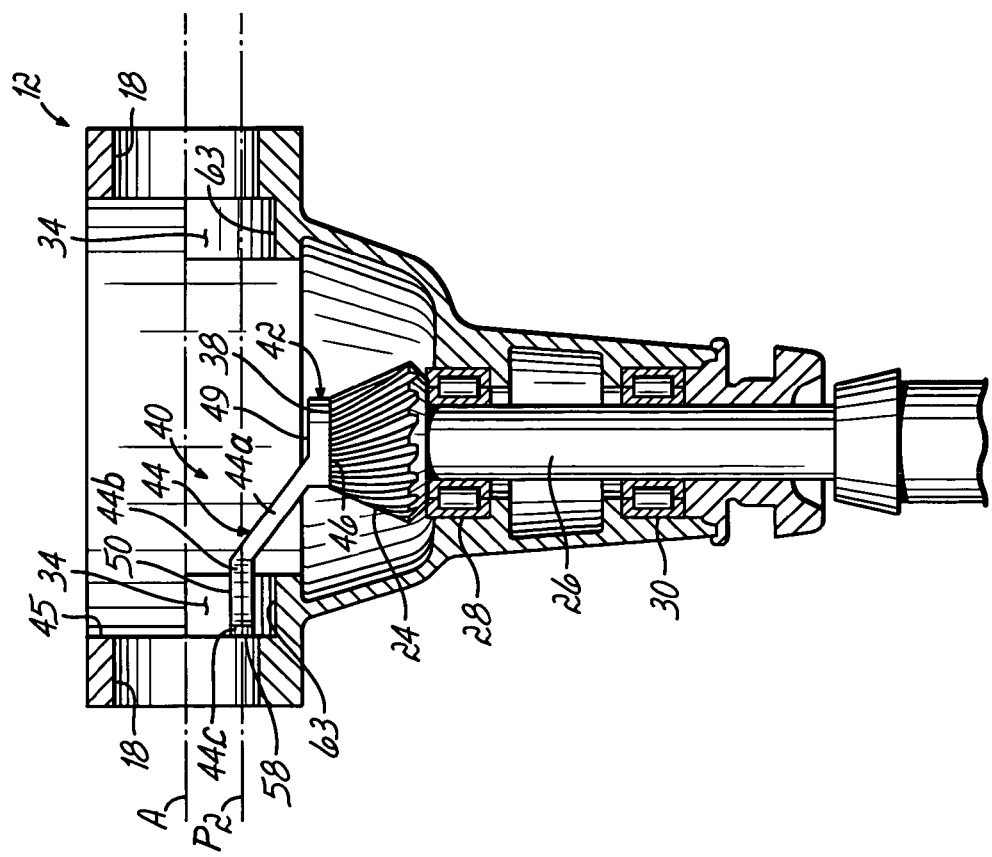
FIG. 4
FIG. 3

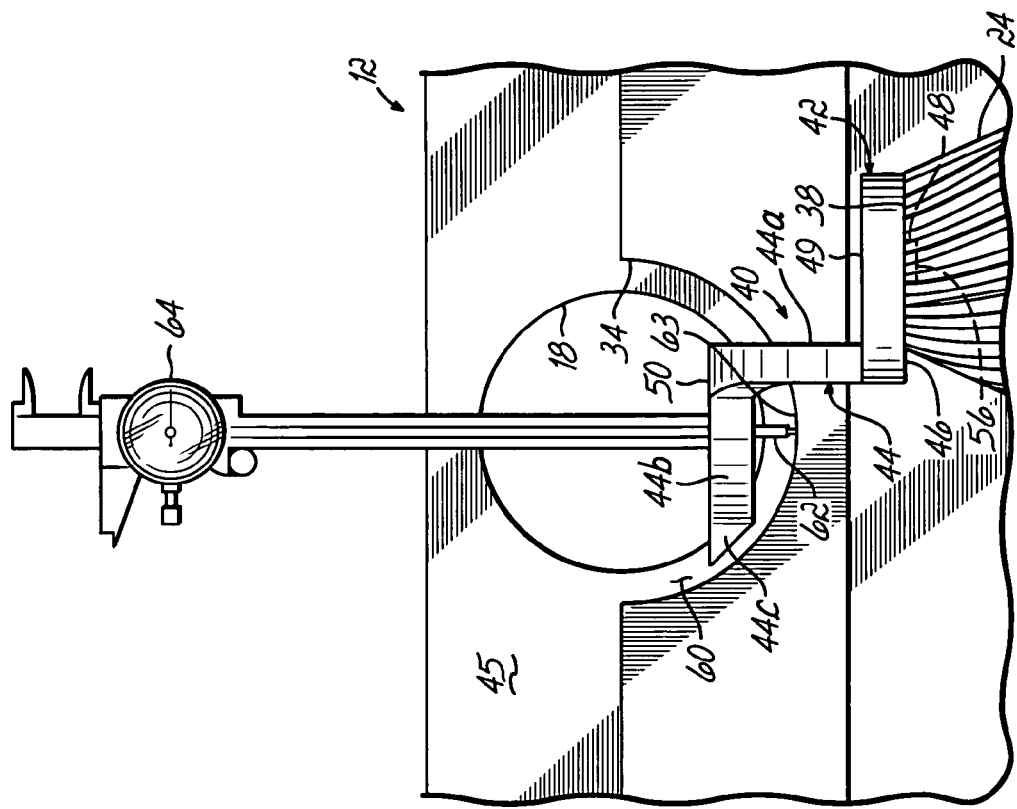
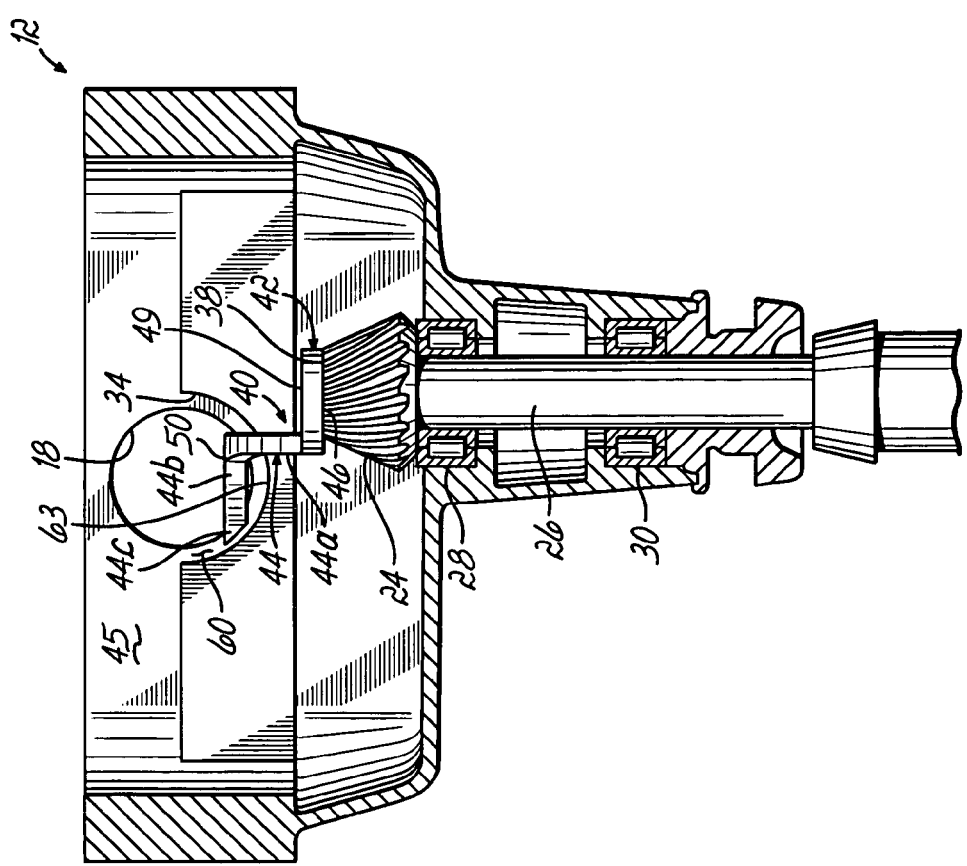

PINION GEAR DEPTH MEASUREMENT TOOL

The present application claims the filing benefit of U.S. provisional application Ser. No. 60/599,442, filed Aug. 6, 2004, the disclosure of which is hereby incorporated herein by reference in its entirety.

FIELD OF THE INVENTION

The present invention relates generally to measurement devices, and more particularly, to a measurement tool for determining the depth of a pinion gear in a differential assembly.

BACKGROUND OF THE INVENTION

In many gear trains, the position of each gear in the gear train must be set to ensure proper mating of the gear teeth. This is of particular importance in differential assemblies of power driven vehicles, which play a key role in transferring power from the vehicle engine to the wheels of the vehicle by means of a pinion gear and a ring gear. Both the pinion and ring gears are typically enclosed within a differential housing with several other components of the differential assembly. The ring gear has an axis of rotation which is perpendicular to that of the pinion gear and is operatively connected to a pair of shafts mounted within carrier bearings that are secured on opposite sides of the differential housing within respective semi-circular bearing seats. The pinion gear is mounted upon the end of a drive shaft, and its position relative to the ring gear is typically adjusted by the use of shims or other suitable adjustment devices mounted between a bearing which supports the shaft of the pinion gear and a head thereof.

Oftentimes some of the parts within the differential housing need to be replaced because of wear or breakage. This process usually involves removing the ring gear from the differential housing so that the position of the pinion gear must be measured and adjusted before the ring gear is replaced to ensure proper mating of the gears. Manufacturers customarily provide a specification for setting the proper mating points of the pinion and ring gears. Many times this is specified in the form of a "pinion depth," which is the distance from an end face of the pinion gear to an axis of rotation of the ring gear. Therefore, an accurate measurement tool is needed to determine the depth of the pinion gear to ensure that the gears are mounted according to specification.

Measurement tools known in the art for determining the depth of a pinion gear in a differential assembly involve the use of a shaft or crossbar member that is secured in the bearing seats provided on the opposite sides of the differential housing so as to extend along the rotational axis of the ring gear. A measuring gage is mounted to slide along the shaft until it is positioned over an end face of the pinion gear. In this position, the measurement gage is adjusted until it contacts the end face of the pinion gear. The pinion depth is determined from the measurement obtained by the measurement gage.

Many of the measurement tools known in the art require additional parts that must be interchanged when different sizes of differential assemblies are encountered. These additional parts not only increase the cost of such tools, but also make the measurement process more cumbersome and time consuming. Tools that can be adapted to variations in differential assembly sizes still involve numerous parts that must be properly adjusted before taking any measurement. Such tools are difficult to use and may lead to inaccurate measurements.

Accordingly, a measurement tool is needed for determining the depth of a pinion gear in a differential assembly that involves a minimum number of parts, is relatively inexpensive to make, and can be easily operated to obtain accurate measurement results.

SUMMARY OF THE INVENTION

The present invention overcomes the foregoing and other shortcomings and drawbacks of measurement tools heretofore known for measuring the depth of a pinion gear in a differential assembly. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a measurement tool is provided for determining a position or "pinion depth" of a pinion gear in a differential assembly. The measurement tool of the present invention includes a mounting member configured to contact an end face of the pinion gear and an elongated arm member configured to extend outwardly from the mounting member and toward one side wall of the differential housing.

In one embodiment, the mounting member is generally disc-shaped and has a generally planar mounting surface which contacts the end face of the pinion gear. A projection, such as a pin or boss, extends outwardly from the mounting surface of the mounting member and is configured to engage a blind bore formed in the end face of the pinion gear to register the measurement tool relative to the pinion head.

The arm member of the measurement tool has an arm portion configured to overlie one of the bearing seats of the differential housing when the arm member is placed in contact with the side wall of the differential housing to register the measurement tool relative to the housing. An aperture, such as a slot, is formed through the arm portion of the arm member and is configured to receive a measurement gage therethrough. The aperture lies in a vertical plane which intersects the rotational axis of the ring gear.

The measurement gage, such as a depth rod and dial caliper, is inserted through the aperture and in contact with a surface of the bearing seat for measuring a distance between the surface of the bearing seat and a reference surface of the arm portion. In accordance with the principles of the present invention, a user can determine the depth of the pinion gear from the measurement obtained with the measurement gage and the known geometry of the measurement tool.

The measurement tool of the present invention is a unitary structure which has no adjustable or interchangeable parts. Unlike other measurement tools known in the art, the measurement tool of the present invention does not require the use of a shaft or crossbar member extending between the pair of bearing seats to determine the pinion depth. Thus, the measurement tool of the present invention can be easily mounted in a differential assembly to accurately determine the depth of the pinion gear. The design of the measurement tool allows for lower production costs, making it economically feasible to use for different sizes of differential assemblies.

These and other objects and advantages of the present invention shall be made apparent from the accompanying drawings and the descriptions thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 3 is a view similar to FIG. 1, with the measurement tool of FIG. 2 mounted in its operative position.

FIG. 4 is a side elevational view of the differential assembly of FIG. 3, with the measurement tool of FIG. 2 mounted in its operative position;

FIG. 5 is a cross-sectional view taken along line 5-5 of FIG. 4; and

FIG. 6 is an enlarged view of the circled area in FIG. 5, showing a measurement gage in use with the measurement tool for measuring the depth of the pinion gear in accordance with the principles of the present invention.

DETAILED DESCRIPTION OF THE PREFERRED EMBODIMENT

Figure 2:
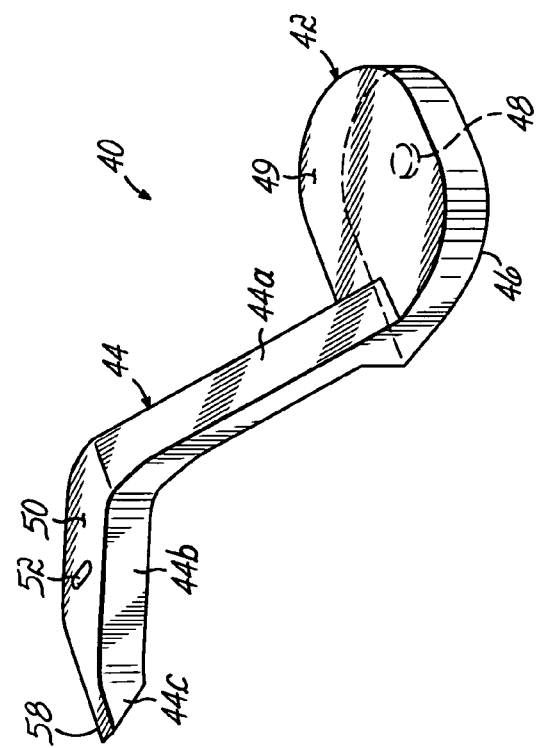
FIG. 2 is a perspective view of a measurement tool in accordance with the principles of the present invention for measuring the depth of a pinion gear in the differential assembly of FIG. 1.
Figure 1:
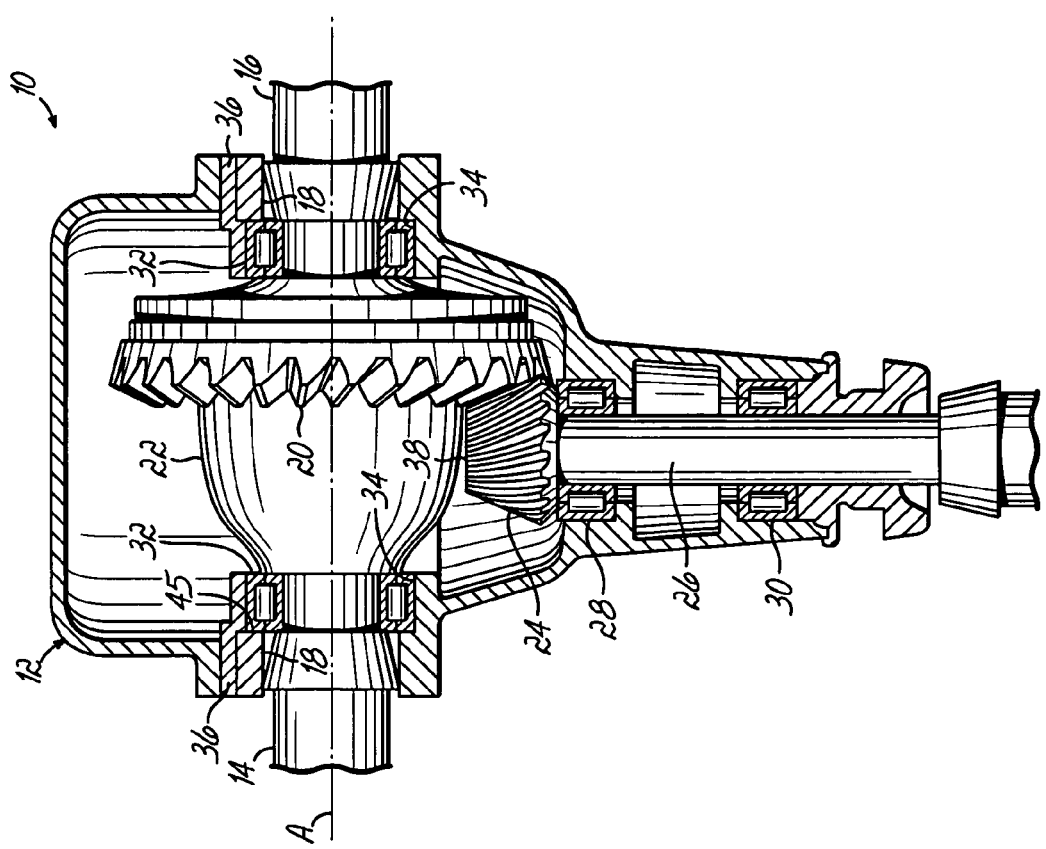
FIG. 1 is a top elevational view, partially in cross-section, of an exemplary differential assembly.

With reference to FIG. 1, an exemplary differential assembly 10 is shown. The differential assembly 10 includes a differential housing 12 configured to receive axle shafts 14 and 16 through opposite journals 18. Inside the differential housing 12, the axle shafts 14 and 16 rotatably support a ring gear 20 and a differential case assembly 22 as is well known in the art.

The differential assembly 10 further includes a pinion gear 24 coupled to the end of a drive shaft 26 which is driven by a transmission (not shown). The pinion gear 24 is configured to mesh with the ring gear 20, and has an axis of rotation perpendicular to that of the ring gear 20 and axle shafts 14 and 16. As the drive shaft 26 rotates, the pinion gear 24 engages the ring gear 20 to transfer power to the axle shafts 14 and 16 and wheels (not shown) operatively connected thereto.

The drive shaft 26 is mounted within bearings 28 and 30 and the axle shafts 14 and 16 are mounted within carrier bearings 32 mounted on opposite sides of the differential housing 12. As shown in FIGS. 3-6, the differential housing 12 includes a pair of semi-circular bearing seats 34 which are configured to support the carrier bearings 32 on the opposite sides of the differential housing 12. Bearing caps 36 (FIG. 1) are mounted to the differential housing 12 to secure the carrier bearings 32 within the bearing seats 34 so that the carrier bearings 32 support the axle shafts 14 and 16 for rotation relative to the differential housing 12.

When parts within the differential assembly 10 are being replaced, the differential housing 12 is opened and the bearing caps 36 are removed. The axle shafts 14 and 16, the ring gear 20, the differential case assembly 22, and the carrier bearings 32 are then removed from the differential housing 12. Before reassembling these parts, the axial position or depth of the pinion gear 24 is measured by determining the distance from an end face 38 of the pinion gear 24 to the rotational axis "A" (FIGS. 1 and 3) of the ring gear 20. This measurement is commonly referred to as the "pinion depth". If necessary, the axial position of the pinion gear 24 is adjusted to obtain the correct pinion depth, which ensures that it will properly mesh with the ring gear 20. Oftentimes this axial adjustment is accomplished by placing shims (not shown) between the head of the pinion gear 24 and the bearing 28 so that the proper pinion depth is set.

Referring to FIGS. 2-6, a measurement tool 40 according to the principles of the present invention is provided to determine the axial position, or pinion depth, of the pinion gear 24. In one embodiment, the measurement tool 40 is a unitary structure and comprises a mounting member 42 configured to contact the end face 38 of the pinion gear 24 and an elongated arm member 44 configured to extend outwardly from the mounting member 42 and toward one side wall 45 of the differential housing 12. In one embodiment, the mounting member 42 is generally disc-shaped and includes a generally planar mounting surface 46 which is configured to contact the end face 38 of the pinion gear 24. A projection 48, such as a pin or boss, extends outwardly from the mounting surface 46 of the mounting member 42 for properly positioning the mounting member 42 on the end face 38 of the pinion gear 24 as will be described in greater detail below.

In one embodiment, the arm member 44 includes a first arm portion 44a extending outwardly at an oblique angle from a generally planar surface 49 of the mounting member 42, a second arm portion 44b extending outwardly at an oblique angle from a distal end of the first arm portion 44a, and a third arm portion 44c extending outwardly at an oblique angle from a distal end of the second arm portion 44b.

The first arm portion 44a extends outwardly from the mounting member 42 at an angle of about 35° relative to plane defined by the mounting surface 46 of the mounting member 42. The second arm portion 44b extends outwardly at an angle of about 45° from the distal end of the first arm portion 44a and lies in a plane which is generally parallel to the mounting surface 46 of the mounting member 42. The third arm portion 44c extends outwardly at an angle of about 45° from the distal end of the second arm portion 44b and lies in a common plane with the second arm portion 44b so as to be oriented generally perpendicular to the first arm portion 44a. Of course, it will be appreciated that other orientations of the first, second and third arm portions 44a, 44b and 44c, respectively, are possible as well without departing from the spirit and scope of the present invention.

Further referring to FIGS. 2-6, the second arm portion 44b includes a generally planar reference surface 50 which lies in a plane generally parallel to the plane defined by the mounting surface 46 of the mounting member 42. The perpendicular distance from the mounting surface 46 to the reference surface 50 is a fixed dimension of the measurement tool 40 which is known from its geometry. The second arm portion 44b also includes an aperture 52, such as a slot in one embodiment, formed through the second arm portion 44b for purposes to be described in detail below.

In use, the measurement tool 40 is mounted on the end face 38 of the pinion gear 24, as shown in FIGS. 3-6, with the mounting surface 46 in contact with the end face 38. The projection 48 is configured to engage a blind bore 56 commonly formed in the end face 38 of the pinion gear 24 to register the measurement tool 40 relative to the pinion gear 24. When mounted in contact with the end face 38 of the pinion gear 24, the projection 48 and the mounting surface 46 of the mounting member 42 secure the measurement tool 40 in fixed axial and radial positions relative to the pinion gear 24.

Because the mounting surface 46 is in contact with and lies generally parallel to the end face 38 of the pinion gear 24, the reference surface 50 lies generally parallel to the end face 38 of the pinion gear 24 as well. Thus, the perpendicular distance from the end face 38 of the pinion gear 24 to the reference surface 50 is a known dimension that is essentially equal to the known fixed dimension of the measurement tool 40 defined by the perpendicular distance between the mounting surface 46 and the reference surface 50.

While secured on the end face 38 of the pinion gear 24, the measurement tool 40 is rotated about a pivotal connection established between the projection 48 and the bore 56 to position the third arm portion 44c generally parallel to the side wall 45 of the differential housing 12. In this position, a surface 58 of the third arm portion 44c contacts a carrier bearing thrust surface 60 on the side wall 45 of the differential housing 12 to register the mounting tool 40 relative to the differential housing 12. When this contact occurs, the aperture 52 in the second arm portion 44b lies in a vertical plane "$P_1$" (FIG. 4) which intersects the rotational axis "A" (FIGS. 1 and 3) of the ring gear 20 and in a horizontal plane "$P_2$" (FIG. 3) which is parallel to, and offset from, the rotational axis "A" of the ring gear 20. This orientation represents the proper position of the measurement tool 40 for measuring the depth of the pinion gear 24. This simple manual alignment capability of the measurement tool 40 greatly reduces the amount of time and effort needed for an operator to measure the pinion depth.

To measure the pinion depth, a depth rod 62 is inserted through the aperture 52 in the second arm portion 44b so that the depth rod 62 lies in the vertical plane "$P_1$" that intersects the rotational axis "A" of the ring gear 20. The depth rod 62 is thereafter adjusted until it contacts a surface 63 of the bearing seat 34 as shown in FIG. 6. The perpendicular distance of the depth rod 62 from the reference surface 50 to the surface 63 of the bearing seat 34 can be measured using a dial caliper 64 (FIG. 6) or other suitable measurement gage. The measurement taken with the dial caliper 64 can then be subtracted from the known fixed dimension of the measurement tool 40 defined by the perpendicular distance between the mounting surface 46 and the reference surface 50 to determine the perpendicular distance from the end face 38 of the pinion gear 24 to the surface 63 of the bearing seat 34. To then determine the pinion depth, i.e., the perpendicular distance from the end face 38 of the pinion gear 24 to the rotational axis "A" of the pinion gear 24, the computed value of the perpendicular distance from the end face 38 of the pinion gear 24 to the surface 63 of the bearing seat 34 is added to the known radius of the bearing seat 34. The determined pinion depth can be compared to the specifications provided by the manufacturer, and appropriate adjustments to the axial position of the pinion gear 24 can be made with shims, if necessary.

It will be appreciated that the measurement tool 40 of the present invention can accommodate many different sizes of differential assemblies simply by changing the dimensions or geometry of the measurement tool 40. The design of the measurement tool 40 enables different sizes of the measurement tool 40 to be produced and used in an economical manner in accordance with the principles of the present invention.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of Applicant's general inventive concept.

Having described the invention,

I claim:

1. A measurement tool for determining a position of a pinion gear in a differential assembly having a housing and a pair of bearing seats provided on opposite sides of the housing, comprising:
    a mounting member having a mounting surface configured to contact an end face of the pinion gear;
    an elongated arm member extending outwardly from said mounting member and having an arm portion configured to overlie one of the bearing seats when the mounting member is placed in contact with the end face of the pinion; and
    an aperture formed through said arm portion and configured to receive a measurement gage therethrough in contact with a surface of the one bearing seat for measuring a distance between the surface of the bearing seat and a reference surface of said arm portion from which the position of the pinion gear can be determined.

2. The measurement tool of claim 1 wherein said mounting surface is generally planar.

3. The measurement tool of claim 2 wherein said reference surface is generally planar and lies in a plane generally parallel to said mounting surface.

4. The measurement tool of claim 1 further comprising a projection extending outwardly from said mounting surface.

5. The measurement tool of claim 1 wherein said aperture comprises a slot.

6. The measurement tool of claim 1 wherein said mounting member is generally disc-shaped.

7. The measurement tool of claim 1 wherein said arm member comprises:
    a first arm portion extending outwardly from said mounting member;
    a second arm portion extending outwardly from a distal end of said first arm portion; and
    a third arm portion extending outwardly from a distal end of said second arm portion.

8. The measurement tool of claim 7 wherein said second and third arm portions lie in a common plane.

9. The measurement tool of claim 7 wherein said third arm portion is oriented generally perpendicular to said first arm portion.

10. The measurement tool of claim 7 wherein said first arm portion extends outwardly from said mounting member at an oblique angle.

11. The measurement tool of claim 10 wherein said second arm portion extends outwardly from said distal end of said first arm portion at an oblique angle.

12. The measurement tool of claim 11 wherein said third arm portion extends outwardly from said distal end of said second arm portion at an oblique angle.

13. A measurement tool for determining a position of a pinion gear in a differential assembly having a housing and a pair of bearing seats provided on opposite sides of the housing, comprising:
    a generally disc-shaped mounting member having a mounting surface configured to contact an end face of the pinion gear;
    an elongated arm member extending outwardly from said mounting member and having a first arm portion extending outwardly from said mounting member, a second arm portion extending outwardly from a distal end of said first arm portion, and a third arm portion extending outwardly from a distal end of said second arm portion, said second arm portion being configured to overlie one of the bearing seats when the mounting member is placed in contact with the end face of the pinion gear; and an aperture formed through said second arm portion and configured to receive a measurement gage therethrough in contact with a surface of the one bearing seat for measuring a distance between the surface of the bearing seat and a reference surface of said arm portion from which the position of the pinion gear can be determined.

14. The measurement tool of claim 13 wherein said mounting surface is generally planar.

15. The measurement tool of claim 14 wherein said reference surface is generally planar and lies in a plane generally parallel to said mounting surface.

16. The measurement tool of claim 13 further comprising a projection extending outwardly from said mounting surface.

17. The measurement tool of claim 13 wherein said reference surface is associated with said second arm portion.

18. The measurement tool of claim 13 wherein said aperture comprises a slot.

19. The measurement tool of claim 13 wherein said second and third arm portions lie in a common plane.

20. The measurement tool of claim 13 wherein said third arm portion is oriented generally perpendicular to said first arm portion.

21. The measurement tool of claim 13 wherein said first arm portion extends outwardly from said mounting member at an oblique angle.

22. The measurement tool of claim 21 wherein said second arm portion extends outwardly from said distal end of said first arm portion at an oblique angle.

23. The measurement tool of claim 22 wherein said third arm portion extends outwardly from said distal end of said second arm portion at an oblique angle.

24. A method for determining a position of a pinion gear in a differential assembly using a measurement tool, the differential assembly having a housing and a pair of bearing seats provided on opposite sides of the housing, comprising:

mounting the measurement tool in contact with an end face of the pinion gear with a portion of the measurement tool overlying one of the bearing seats;

measuring a distance between a reference surface of the measurement tool and a surface of the one bearing seat with a measurement gage; and determining the position of the pinion gear from the measurement obtained during the measuring step.

25. The method of claim 24 further comprising the step of inserting the measurement gage through the portion of the measurement tool during the measuring step.

26. The method of claim 24 further comprising the step of registering the measurement tool relative to the pinion gear during the mounting step.

27. The method of claim 26 further comprising the step of registering the measurement tool relative to the housing of the differential assembly during the mounting step.

* * * * *